United States Patent [19]

Burns et al.

[11] Patent Number: 4,553,187
[45] Date of Patent: Nov. 12, 1985

[54] OVERCURRENT DETECTION DEVICE

[75] Inventors: James A. Burns, Menomonee Falls; Dennis C. Nolan, Milwaukee, both of Wis.

[73] Assignee: Allen-Bradley Company, Milwaukee, Wis.

[21] Appl. No.: 532,066

[22] Filed: Sep. 14, 1983

[51] Int. Cl.[4] .......................................... H02H 3/087
[52] U.S. Cl. ...................................... 361/96; 361/31
[58] Field of Search ............................ 361/23, 31, 96; 318/387, 474, 447

[56] References Cited

U.S. PATENT DOCUMENTS

| | | | |
|---|---|---|---|
| 3,419,757 | 12/1968 | Steen | 361/96 |
| 3,831,061 | 8/1974 | Boyd | 361/94 |
| 3,959,704 | 5/1976 | McCrea | 361/31 |
| 4,021,700 | 5/1977 | Ellis-Anwyl | 361/28 |
| 4,327,391 | 1/1980 | Grzebielski | 361/31 |

OTHER PUBLICATIONS

Reliance Electric Company, Instruction Manual for Max Pak Plus Spindle Drive, Sep. 1981, pp. 29-32.

Primary Examiner—A. D. Pellinen
Assistant Examiner—Hong K. Choe
Attorney, Agent, or Firm—Quarles & Brady

[57] ABSTRACT

An overload detection circuit protects a motor against currents above rated current that persist for certain exposure times. The allowable exposure times are inversely related to the degree of overload current. The circuit has two overload current sensors with two respective overload thresholds. These are both connected to a pulse generating circuit and the pulse rate is accelerated when the second overload threshold is reached. The pulse generating circuit couples pulses to a pair of cascaded counters which generate a fault signal when a predetermined count is reached. The pulse generating circuit includes an integrator with a capacitor that must be discharged, before another pulse can be generated. The pulse generating circuit includes a comparator which operates a switch to discharge the capacitor shortly before coupling each pulse to the counters, to prevent a delay that would otherwise occur between signals from the integrator circuit.

6 Claims, 5 Drawing Figures

OVERCURRENT DETECTION DEVICE

BACKGROUND OF THE INVENTION

1. Field of the Invention

The invention relates to overload detection circuits for the protection of electrical motors and other electrical equipment.

2. Description of the Prior Art

One prior overcurrent detection device is disclosed in Grzebielski, U.S. Pat. No. 4,327,391. That device senses current that exceeds 100% of rated current for a DC motor. The device uses an integrator circuit to generate a sawtooth signal that is converted to a pulse train by repeatedly discharging a capacitor through a monostable multivibrator circuit. The pulses are coupled to a pair of cascaded counters which count up in response to an overcurrent condition and generate a fault signal. The fault signal is coupled to a latch for operation of a relay that disconnects power to the motor.

In another prior overcurrent detection device the sawtooth output signal from the integrator circuit is used with one up-counting comparator and one down-counting comparator to generate the pulse train. This type of pulse generator eliminates the need for some of the components used in Grzebielski, such as a capacitor that is discharged through the multivibrator circuit. In using the integrator circuit to more directly generate pulses there is a technical problem in resetting the integrator circuit without creating a time delay between pulses, and it has not been apparent how to accomplish this.

In both of the prior circuits referred to above, there has been but a single threshold for generating overcurrent pulses, and this threshold has typically been set at or near 100% of rated current for the protected electrical device. In today's products, there is an increasing need to provide a more sophisticated response to different overcurrent conditions, and it is believed that the present invention contributes significantly in satisfying that requirement.

SUMMARY OF THE INVENTION

The invention relates to a first improvement of multiple current-sensing circuits for an overcurrent protection device which are responsive in different degrees to various overcurrent conditions. Whereas the prior art provided a typical inverse response characteristic of overload trip time as a function of overcurrent, the present invention provides a two-segment response characteistic in which the breakpoint between the segments and the shape of the response curve in the second segment can be controlled by the selection of components for the invented circuit.

The invention also relates to a second improvement in overcurrent detection devices of the type using an integrator circuit to generate pulses to indicate overcurrent. The invention provides an integrator reset circuit which is triggered by the leading edge of a pulse before the trailing edge is coupled to the overload pulse counters to advance the counters by one count.

One object of the invention is to provide an accelerated response for more severe overcurrent conditions, and a more typical response to moderate overcurrent conditions.

Another object of the invention is to provide a more refined response to various overcurrent conditions.

Another object of the invention is to provide an overcurrent detection circuit with a minimum of components to accomplish its desired functions, thereby lowering the cost of production.

Another object of the invention is to provide an overload detection device for more precisely resetting an integrator circuit used to detect overcurrent conditions.

These and other objects and advantages of the invention will be apparent from the following description of a preferred embodiment in which reference is made to the drawings that are incorporated herein. The preferred embodiment is only illustrative, however, and the scope of the invention, which contemplates other embodiments as well, is reserved for the claims which follow the description.

DETAILED DESCRIPTION OF THE PREFERRED EMBODIMENT

Figure 1:
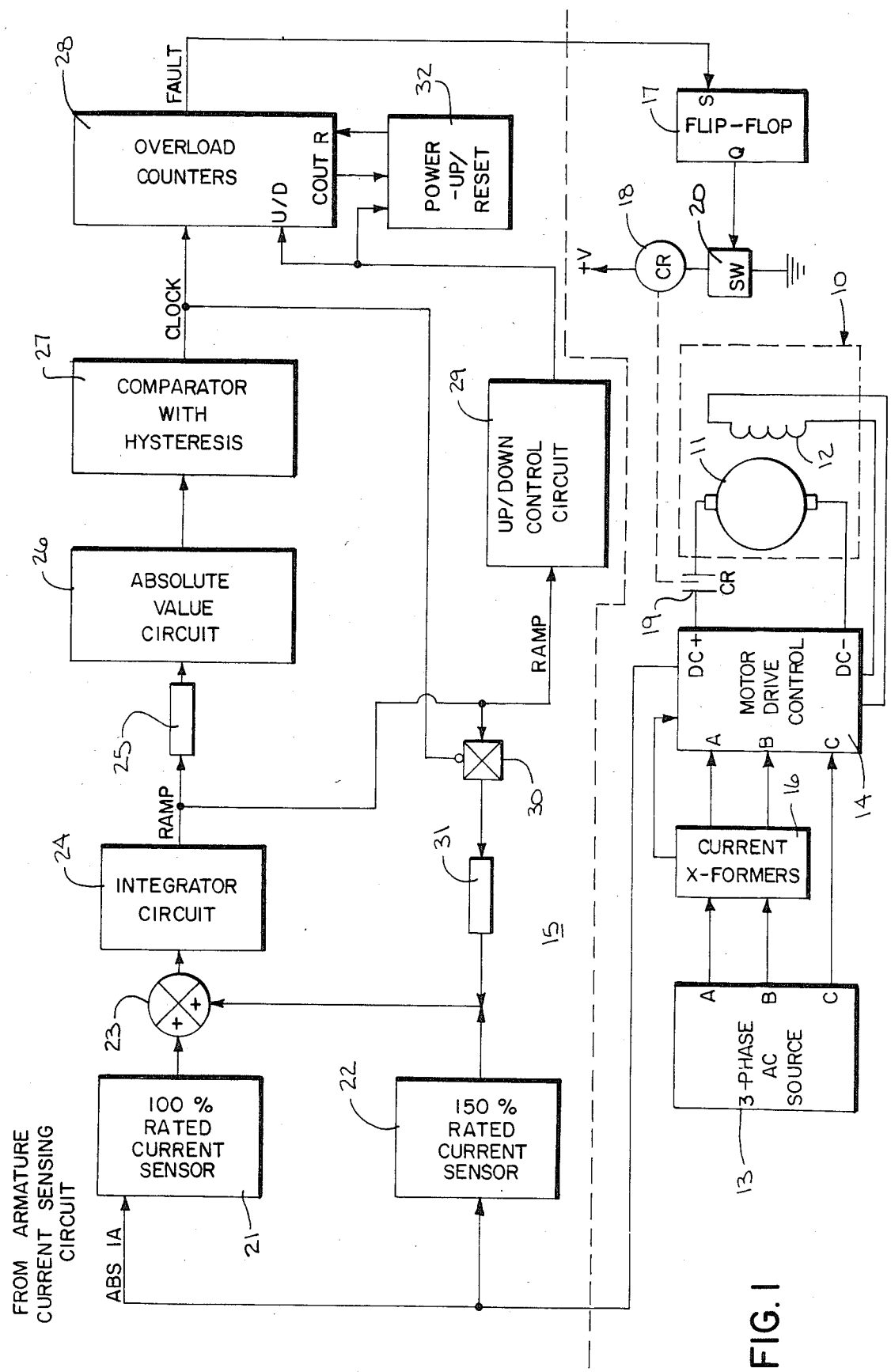
FIG. 1 is a block diagram of the overload detection device of the present invention.

Referring to FIG. 1, overload current is detected in the operation of a DC electrical motor 10 having an armature 11 and a field winding 12. The motor is energized from a power source 13 through a DC motor drive control 14 in which the overload detection device 15 seen above the dashed line in FIG. 1 can be utilized.

The motor drive control 14 includes current transformers 16 which sense armature current on the AC side of the motor drive 14. This current is rectified in the motor drive control 14 to provide a signal (ABS.IA) representing the magnitude of direct current supplied to the armature 11. This signal is coupled to the overload detection device 15 and more specifically, to circuits 21 and 22 to be described below. The output of the overload detection device 15 is a FAULT signal which is coupled to a fault flip-flop 17. The fault flip-flop 17 in turn couples a signal to switching circuitry 20 to deenergize a coil 18 in a control relay (CR). The deenergizing of the coil 18 opens a pair of associated contacts 19 to disconnect the motor 10 from the line supplying DC power to it. The coil 18 of the control relay is connected between a voltage source (+V) and ground through the switching circuitry (SW) 20, which is operated to energize the coil 18 and close the contacts 19 during start up of the motor 10.

An overview of the operation of the overcurrent detection circuit 15 will now be described. As seen in FIG. 1, when the magnitude of ABS.IA indicates a current in excess of 100% of rated current for the motor armature 10, this condition will be sensed by 100% RATED CURRENT SENSOR circuit 21. When the magnitude of ABS.IA indicates a current in excess of 150% of rated armature current, this connection will be sensed by a 150% RATED CURRENT SENSOR circuit 22. The output of the two sensor circuits 21 and 22 is summed at a summing input 23 of an INTEGRATOR CIRCUIT 24. In response to a signal from either the first sensing circuit 21, or in response to signals from both circuits 21 and 22, the INTEGRATOR CIRCUIT 24 will generate a repetitive sawtooth waveform (RAMP) of the type illustrated in the upper portion of FIG. 4. The RAMP signal may be of either polarity. It will be negative-going for overcurrent conditions and positive-going when the magnitude of ABS.IA represents a current less than 100% of rated armature current. In order to provide a unidirectional signal, the output of the INTEGRATOR CIRCUIT 24 is coupled through a resistor 25 to an ABSOLUTE VALUE CIRCUIT 26.

Continuing to the right in FIG. 1, the ABSOLUTE VALUE CIRCUIT 26 will generate a positive-going ramp signal at its output that is coupled to a COMPARATOR WITH HYSTERESIS circuit 27. This circuit 27 generates the CLOCK pulses from its output as illustrated in the lower half of FIG. 4. These pulses are coupled to the CLOCK inputs on a pair of cascaded overload counters 28. When 128 pulses are counted, the overload counters 28 will generate a DC logic level FAULT signal to the fault latch 17 described above, and the motor 10 will be disconnected from the line supplying power to it.

The above sequence assumes that the overcurrent has persisted so that the counters have counted "up" for 128 consecutive pulses. The RAMP output signal from the integrator circuit 24 is also coupled to an UP/DOWN control circuit 29 which senses the polarity of the RAMP signal, i.e. whether it is positive-going or negative-going. The UP/DOWN CONTROL circuit 29 is coupled to up/down (U/D) control inputs on the counters 28. When a RAMP signal is negative-going (signifying overcurrent), the UP/DOWN CONTROL CIRCUIT 29 signals the counters to count up, and when the RAMP signal is positive-going (signifying less than 100% of rated current), the UP/DOWN CONTROL CIRCUIT 29 signals the counters to count down.

Besides coupling pulses to the counters 28, the COMPARATOR WITH HYSTERESIS circuit 27 is connected to couple signals to a control input on an analog switch 30. One terminal on the switch 30 is connected to the output of the INTEGRATOR CIRCUIT 24 and another terminal is connected through resistor 31 to the summing input 23 on the integrator circuit 24. The switch 30 is closed in response to a signal from the COMPARATOR WITH HYSTERESIS circuit 27 to connect resistor 31 to the INTEGRATOR CIRCUIT 24 to reset that circuit 24 for the next pulse, as will be explained in greater detail below.

Also shown in FIG. 1 is a POWER-UP/RESET circuit 32. The counters 28 have a normal capacity of counting to 255$_{10}$ pulses and then "rolling over to zero". The counters 28 can also roll over on the lower end by counting down to zero and then switching to the highest possible count of 255$_{10}$. Since the counters 28 have been connected in this circuit to generate a FAULT signal after 128 pulses, the rollover is not a problem on the up count, but it is a problem on the down count. Therefore, an up/down (U/D) control signal from the UP/DOWN CONTROL CIRCUIT is coupled to the POWER-UP/RESET circuit 32 along with a carry out (COUT) signal from the counters 28. When both of these signals are at a true logic state, the counters 28 will be reset and held at zero to prevent low end rollover until the next "count up" operation, The POWER-UP/RESET circuit 32 also resets the counters 28 to zero when power is applied to the overcurrent detection device 15.

Figure 2A:
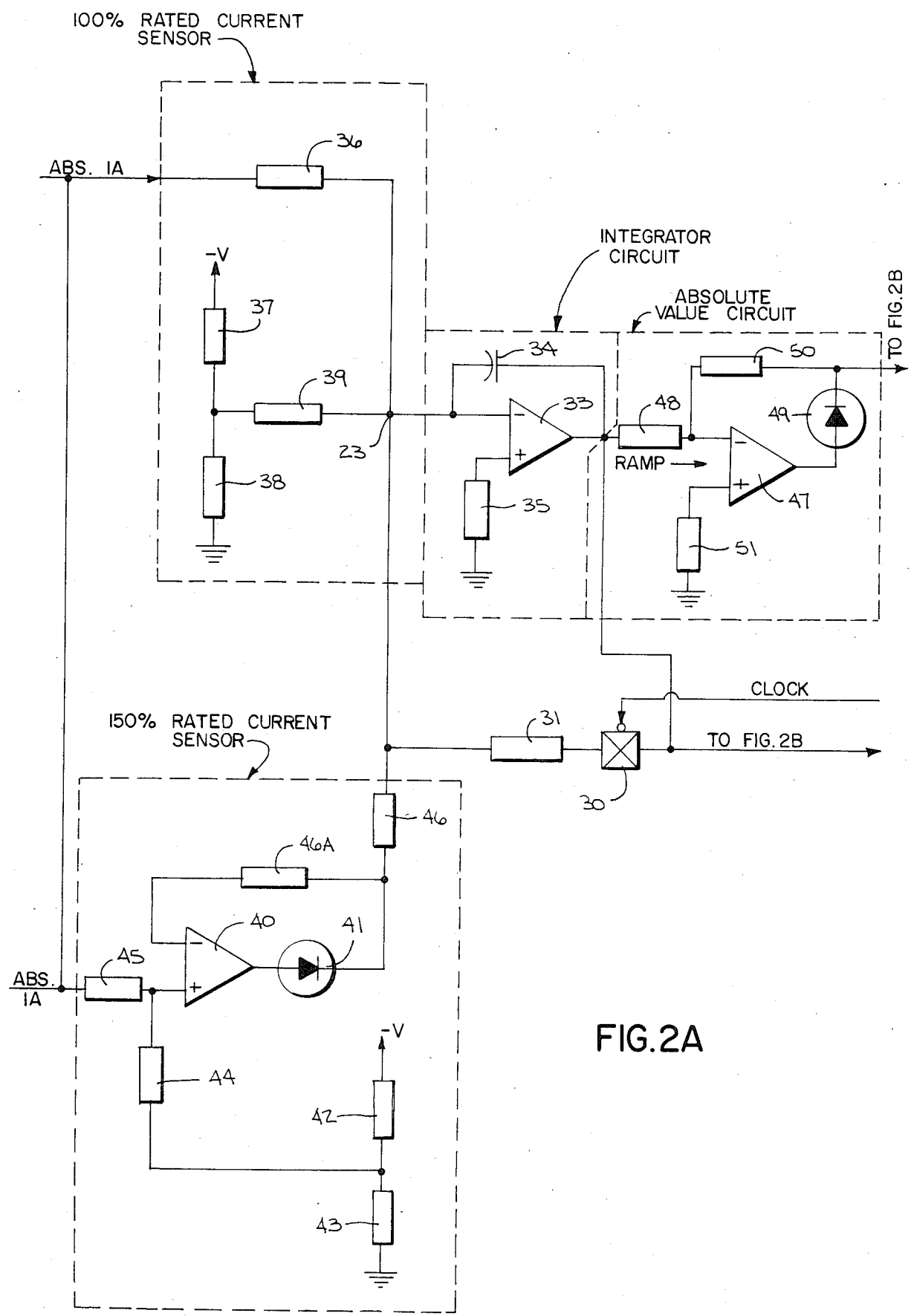
FIGS. 2A and 2B form a schematic diagram showing details of the circuitry represented in FIG. 1.
Figure 3:
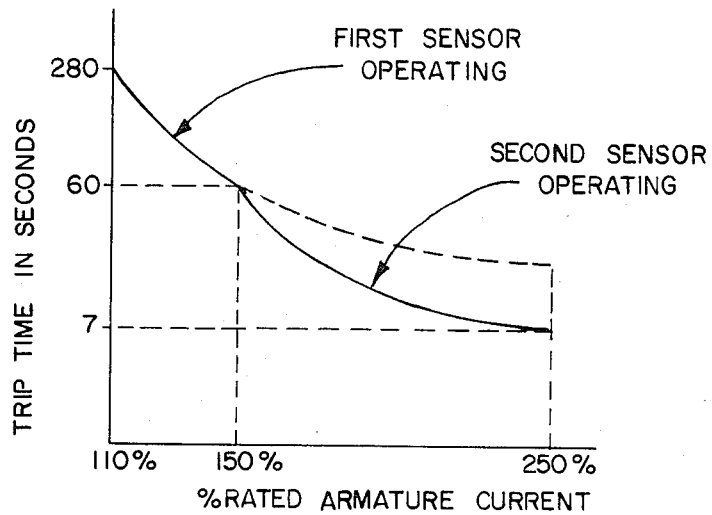
FIG. 3 is a graph of trip time as a logarithmic function of overcurrent as provided by the circuit of FIG. 1.

Referring to FIGS. 2A and 3, the construction and operation of circuits represented in FIG. 1 will now be described in more detail. As seen in FIG. 2A, the INTEGRATOR CIRCUIT 24 includes an operational amplifier 33. A capacitor 34 has one plate connected to the output of the amplifier 33 and another plate connected to the inverting input (−) of the amplifier 33. The non-inverting input (+) is connected through a resistor 35 to ground. The sensing circuits 21 and 22 are connected to a summing input 23, which is coupled to the inverting (−) input of the amplifier 33. By controlling current into this input 23, the sensing circuits 20 and 21 provide variable input signals for varying response of the overload detection device 15.

The 100% RATED CURRENT SENSOR circuit 21 includes a resistor 36 which is connected on one side to receive the ABS.IA signal representing the magnitude of armature current. The other side of the resistor 36 is connected to the summing input 23 on the INTEGRATOR CIRCUIT 24. When armature current is below 100% of its rated value, a positive signal through resistor 36 is offset by a negative signal provided by a biasing network of resistors 37, 38 and 39. Resistors 37 and 38 are connected between a negative voltage source (−V) and ground to divide a negative biasing voltage. When the voltage provided by the ABS.IA signal is between zero and +2 DC volts (for current less than 100% of rated armature current), there is a net negative voltage at summing input 23. This results in a positive-going ramp signal at the output of the INTEGRATOR CIRCUIT 24. when the voltage provided by the ABS.IA signal is greater than +2 DC volts, there is a net positive voltage at the summing input 23 and a negative-going ramp signal is produced at the output of the INTEGRATOR CIRCUIT 24. So, for current less than the 100% level, there is a positive-going ramp signal and for current greater than the 100% current level there is a negative-going ramp signal at the output of the INTEGRATOR CIRCUIT 24.

The 150% RATED CURRENT SENSOR circuit 22 is different than the 100% RATED CURRENT SENSOR circuit 21, in that it does not generate any signal to the INTEGRATOR CIRCUIT 24 when the ABS.IA signal is below the magnitude proportional to 150% of rated armature current (below +3 DC volts). For this type of operation, the circuit 22 is provided with an operational amplifier 40 and a diode 41 having an anode connected to the output of the amplifier 40. A negative bias of −3.0 DC volts is provided at the non-inverting (+) input on the amplifier 40 by a biasing network of resistors 42, 43 and 44. As seen in FIG. 2A resistors 42 and 43 are connected in series between a negative voltage source (−V) and ground, and resistor 44 is connected to a junction between the other two rsistors 42 and 43 and the non-inverting (+) input to the amplifier 40. The ABS.IA signal is received through a resistor 45 which also is connected to the non-inverting (+) input of the amplifier 40 and which has the same resistance as the resistor 44.

When the ABS.IA signal is below a +3.0 DC volts, the voltage at the non-inverting (+) input to the amplifier 40 will be negative or zero, and the signal at the output of the amplifier 40 will also be negative or zero. The diode 41, however, prevents any negative signal from being transmitted through resistor 46. When the ABS.IA signal rises above +3.0 DC volts, the output signal will drive current through the diode 41 and the resistor 46 to the summing input 23 on the INTEGRA- TOR CIRCUIT 24, where it will be summed with current being received through resistor 36. In this circuit, the diode 41 does not exhibit the characteristic diode voltage drop due to the connection of the resistor 46A between the cathode of the diode and the inverting (−) input of the amplifier 40. This provides an "active diode" in the circuit.

The effect of the added current provided by the 150% RATED CURRENT SENSOR circuit 22 is seen in the semi-log graph of FIG. 3. As will be explained in more detail below, the pulse rate to the counters accelerates with the increase in current at summing junction 23. This results in an inverse relationship with shorter trip times for higher magnitudes of armature overcurrent than would be provided by 100% RATED CURRENT SENSOR circuit 21 used alone. The trip time effected by circuit 21 varies along a first portion of the curve in a region between 110% and 150% of rated armature current. The trip times vary from about 280 seconds at 110% of rated armature current down to about 60 seconds at 150% of rated armature current. At that point the effect of the second sensor circuit 22 is seen and a second portion of the curve begins at that point and continues to the 250% of rated current level. A dashed line has been provided to extrapolate the first portion of the curve, and it will be seen that the effect of the second sensing circuit 22 is to accelerate tripping and provide shorter trip times than would be experienced with only a single sensing circuit. By selecting different resistance values for resistor 46 in FIG. 2A, the shape of the second portion of the current can be controlled. Thus, the second sensing circuit 22 determines both the breakpoint of the curve and the shape of its second portion.

Referring again to FIG. 2A and 2B, the details of the other circuits seen in FIG. 1 will now be described. As seen in FIG. 2A, the ABSOLUTE VALUE CIRCUIT 26 has an operational amplifier 47 with an inverting (−) input connected by resistor 48 to the output of the INTEGRATOR CIRCUIT 24. The output of the amplifier 47 is connected through a diode 49 and back through resistor 50 to the inverting (−) input. The non-inverting (+) input is connected through resistor 51 to ground. When a positive-going RAMP signal is coupled through resistor 48 it passes through resistor 50 to the COMPARATOR WITH HYSTERESIS circuit 27 in FIG. 2B. When a negative-going ramp signal is coupled through resistor 48 to the inverting (−) input it is inverted to a positive-going signal which is coupled through the diode 49 to the COMPARATOR WITH HYSTERESIS circuit 27 in FIG. 2B.

Figure 2B:
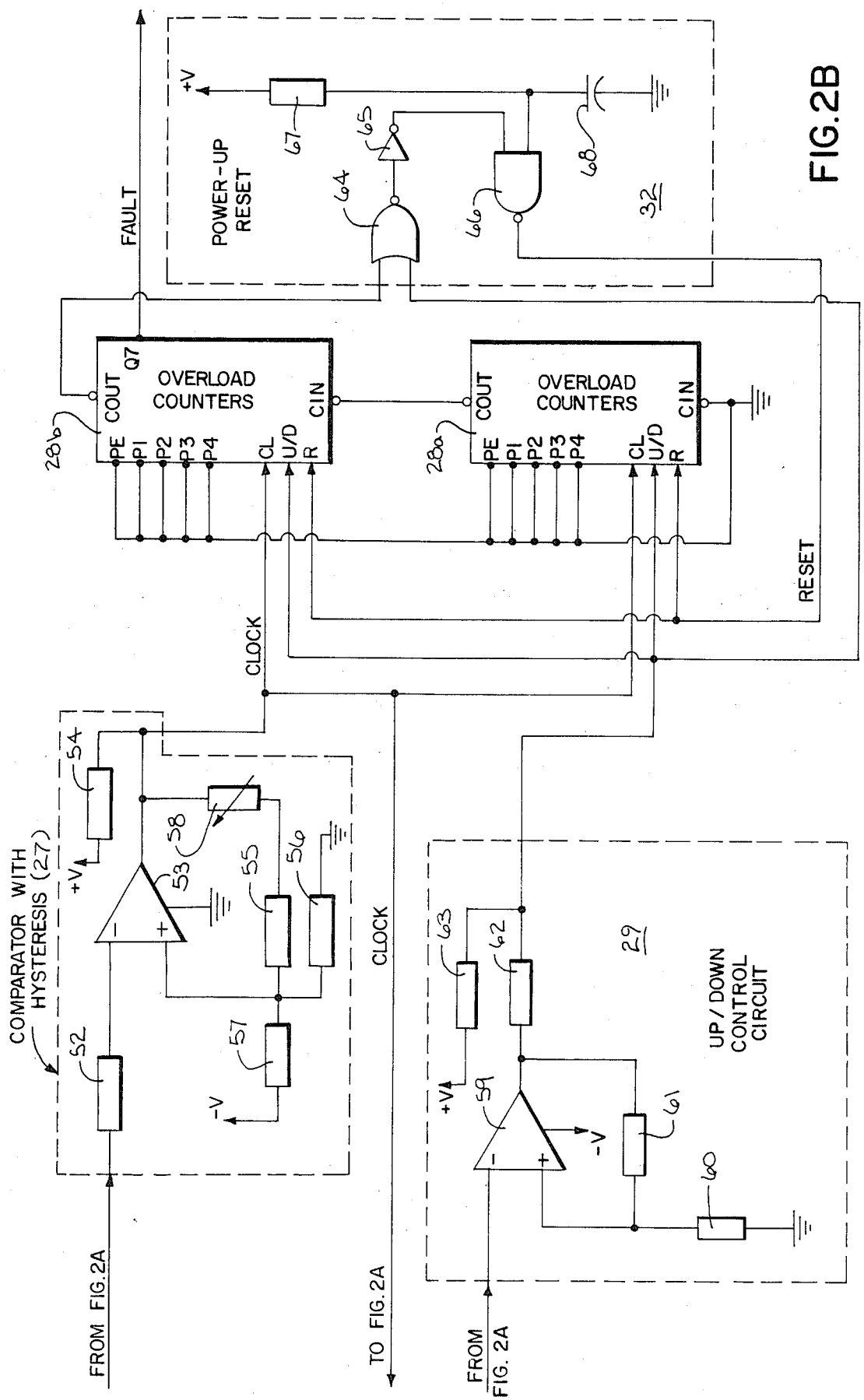

Turning to FIG. 2B, the output signal from the ABSOLUTE VALUE CIRCUIT 26 is coupled through an input resistor 52 to the inverting (−) input of a comparator 53. The comparator 53 is provided with a biasing network of resistors 54,55,56,57 and a potentiometer 58. Assuming that the output of the comparator is initially at a logic high level, current will flow through resistor 54, potentiometer 58 and resistor 55 to the junction connected to the non-inverting (+) input on the comparator 53. Current also flows to this junction through resistor 57 from a positive voltage source (+V). The result is that a positive bias voltage of about +11 DC volts is applied at the non-inverting (+) input.

With this biasing network, the comparator 53 operates with hysteresis. This means that the output voltage of the comparator 53 will switch to a logic low level when the input voltage at the inverting (−) input reaches a first threshold, and the output of the comparator will switch back to a logic high level when the input voltage at the inverting (−) input reaches a second threshold. The values of the components 54,58,55,56 and 57 are chosen so that this first threshold is about +11 DC volts. With this bias voltage at the non-inverting (+) input, the output of the comparator 40 will not switch to a logic low level until a higher voltage is present at the inverting (−) input. When the output of the comparator 53 does switch to the low level, the operation of the biasing network is changed by virtue of the junction between resistor 54 and the potentiometer 58 being close to ground potential. The result is that the bias voltage at the non-inverting input (+) of the comparator 53 is now in the range of 1.0–2.0 DC volts. The output of the comparator 53 will not switch back to the logic high level until the voltage at the inverting input drops below this new threshold.

Figure 4:
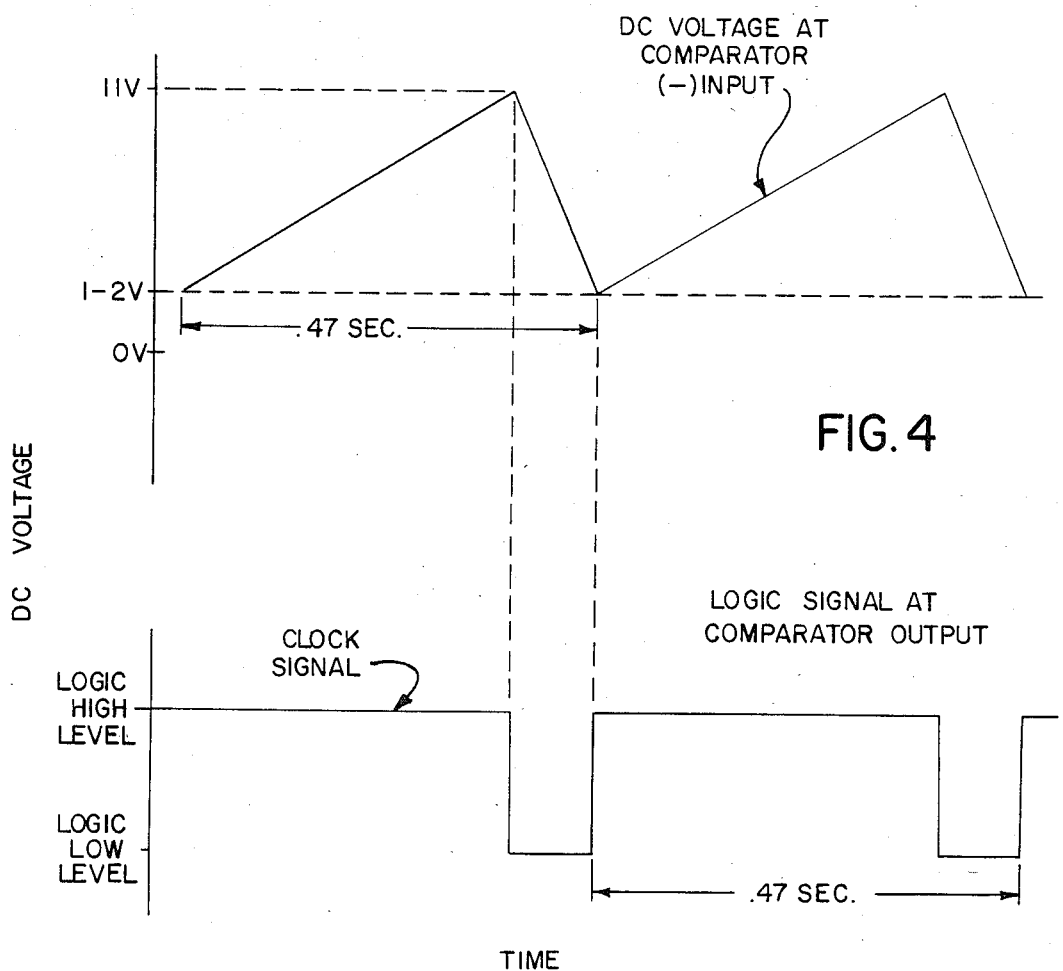
FIG. 4 is a graph of the variation with time of a sawtooth input signal and a corresponding pulse output signal from the comparator of FIG. 1.

This is illustrated in FIG. 4, where the DC voltage at the inverting (−) input of the comparator 53 is shown rising to the 11-volt threshold, where the output of the comparator 53 switches from a logic high level to a logic low level. As mentioned earlier, the output signal from the comparator 53 is provided as the CLOCK signal to the clock (CL) inputs on the counters 28a and 28b seen in FIG. 2B. The clock (CL) inputs are triggered on a rising edge, so the falling edge does not result in adding a count to the accumulated count of the counters. Next, as seen in the upper half of FIG. 4 the voltage at the inverting (−) input of the comparator 53 drops along a declining slope, and when it reaches the lower threshold, its output is switched back to the logic high level to generate a rising edge of the CLOCK pulse. This rising edge will advance the counters by one count.

The clock pulse is not only used to advance the counters, but it is also used to reset the INTEGRATOR CIRCUIT 24 by allowing the discharge of the capacitor 34 associated with that circuit. The CLOCK line in FIG. 2B is coupled to a control input on the analog switch 30 in FIG. 2A. The falling edge of the clock pulse seen in the lower half of FIG. 3 operates the switch 30 to close its contacts and connect resistor 31 across the output and inverting (−) input of the amplifier 33 and therefore, across the capacitor 34. The capacitor 34 will discharge through the switch 30 and resistor 31 to reset the INTEGRATOR CIRCUIT 24 and permit generation of the next ramp in the sawtooth waveform.

Referring again to FIG. 4, the width of the clock pulse provides the time period for the INTEGRATOR CIRCUIT 24 to reset. Without such a circuit, that time period might appear as a delay between individual ramp signals in the sawtooth waveform of FIG. 4. The potentiometer 58 in FIG. 2B allows calibration of the COMPARATOR WITH HYSTERESIS circuit 27 to compensate for a variation between the actual value and the nominal value of the capacitor 34 in the INTEGRATOR CIRCUIT 24.

To provide predictable trip times for the overload detection device, it is important to control the period of a single ramp waveform, e.g. 0.47 seconds in the example illustrated in FIG. 4. The trip time is a function of this time period and the maximum number of pulses (128). The time period of 0.47 seconds in FIG. 4 corresponds to only one percentage of overcurrent. More overcurrent will decrease this time period and increase the pulse rate. Less overcurrent will extend this time period and decrease the pulse rate. If the shape of the ramp signal in FIG. 4 varies due to a variation in the value of the capacitor 34, the time period can still be maintained by changing the threshold voltages through adjustment of the potentiometer 58.

Referring now to FIG. 2B, the UP/DOWN CONTROL CIRCUIT 29, the overload counters 28 and the POWER-UP/RESET circuit 32 will now be described. The UP/DOWN CONTROL CIRCUIT includes a comparator 59 for generating high and low logic signals to the up/down (U/D) input on the overload counters 28a and 28b. This comparator has an inverting (−) input connected to the output of the amplifier 33 in FIG. 2A to receive the RAMP signal. A biasing circuit of resistors 60, 61, 62 and 63 is arranged as follows. Resistor 62 is connected between the output of the comparator 59 and the up/down control (U/D) control inputs on the counters 28a and 28b. Resistor 63 is connected on the side of the resistor 62 towards the up/down (U/D) control inputs and is also connected to a positive supply voltage (+V). Resistor 61 is connected from the output of the comparator 59 to the non-inverting (+) input and resistor 60 is connected between the non-inverting (+) input and ground. This places a positive bias voltage at the non-inverting (+) input. When a positive-going ramp signal is received from the INTEGRATOR CIRCUIT 24 (indicating current below 100% of rated current), the comparator 59 is switched to a negative output voltage. This generates a logic low level signal to the up/down (U/D) control input on the overload counters 28a and 28b. The signal will enable the counters 28a and 28b to count down in response to any CLOCK pulses that are received.

The overload counters 28a and 28b have four preset inputs (P1–P4) and a preset enable (PE) input that are connected to ground. These inputs are used to load a specific count into the counters before entering the counting mode of operation. These inputs are not used here. The carry out (COUT) output on the low order counter 26 is connected to a carry in (CIN) input on the high-order overload counter 28b. Thus, when the first overload counter 28a has counted up to its maximum binary count of $1111_2$ ($15_{10}$) the next clock pulse will generate a signal to the CIN input on the high-order overload counter 28b. The next CLOCK pulse will be counted by the high-order counter, while at the same time this clock pulse will roll over the lower-order counter 28a to $0000_2$. Each time the lower order counter counts up to $1111_2$ a successive signal will be generated on the carry line to the high-order counter 28b which will count the next clock pulse. When the two counters 28a and 28b reach a total binary count of $1000\ 0000_2$, the logic level of a line connected to a $Q_7$ output on the high-order counter 28b will switch to generate a logic FAULT signal to the fault flip-flop 17 seen in FIG. 1. This will operate the control relay as described previously.

Also seen in FIG. 2B are the details of the POWER-UP/RESET circuit 32. The up/down (U/D) control inputs on the counters 28a and 28b are coupled through a two-input NOR gate 64 with the output from the COUT terminal of the second overload counter 28b. The output of the NOR gate 64 is coupled through an inverter 65 to one input on a two-input NAND gate 66. The other input on this NAND gate 66 is connected through a resistor 67 to a positive voltage source (+V) and through a capacitor 68 to ground. The output of the NAND gate 66 is connected to the reset (R) inputs on the counters 28a and 28b.

When the counters 28a and 28b count down to all zeroes and the next pulse is received, a logic low signal will be coupled from the carry out (COUT) output on the second overload counter 28b to one input on the NOR gate 64. When both of the inputs to the NOR gate 64 are low, the output signal is at a logic high level and this is inverted by the inverter 65 to couple a logic low signal to the NAND gate 66. If either of the inputs to the NAND gate 66 are at a logic low level, the output is at a logic high level to generate a reset signal to the reset (R) inputs on the counters 28a and 28b. When both the signal from the carry out (COUT) output on the overload counter 28b, and the signal to the up/down (U/D) control input are at a logic low level, the output of the NAND gate 66 will be at a logic high level to hold the overload counters reset to zero.

The other input to the NAND gate 66 is active during power-up. Normally it is coupled to ground through the uncharged capacitor 68. On power-up the capacitor 68 will charge to remove the logic low signal to the NAND gate 66, which has been holding the counters 28a and 28b in a reset mode during a transient start-up time. The integrated circuits that can be used to construct the overload detection device are as follows:

| Ref. No. | Component | Description |
| --- | --- | --- |
| 17 | flip-flop | MC 14043 NOR R-S Latch manufactured by Motorola, Inc. |
| 33, 40, 47 | operational amplifier | LM 348 operational amplifiers manufactured by National Semiconductor Corporation |
| 53, 59 | comparator | LM 339 quad comparators manufactured by National Semiconductor Corporation |
| 28a, 28b | counters | Two MC 14516 binary up/down counters manufactured by Motorola, Inc. |
| 30 | switch | DG 211 analog switch manufactured by Signetics Corp. |
| 64 | NOR gate | MC 14001 two-input NOR gate manufactured by Motorola, Inc. |
| 66 | NAND gate | MC 14011 two-input NAND gate manufactured by Motorola, Inc. |
| 65 | inverter | MC 14069 hex inverters manufactured by Motorola, Inc. |

While the details of the circuitry have been described for a preferred embodiment, other equivalents may be provided to carry out the invention. These are also intended to be covered by the following claims.

We claim:

1. An overcurrent detection device of the type having a first sensor circuit, a pulse generating circuit and a counter, wherein the sensor circuit is responsive to current feedback from an electrically powered device to produce an overcurrent signal when current exceeds a first current level, wherein the pulse generating circuit is responsive to the overcurrent signal to generate pulses at a rate that is responsive to the magnitude of the overcurrent, wherein the counter is responsive to the pulses to generate a fault signal when enabled by the accumulated count, and wherein an improvement comprises:

a second sensor circuit coupled to the pulse generating circuit and responsive to current feedback from the electrically powered device to couple an overcurrent signal to the pulse generating circuit when current exceeds a second current level in excess of the first current level, wherein said overcurrent signal accelerates the pulse rate to the counter and the occurrence of the fault signal.

2. The overload detection circuit of claim 1, wherein the improvement further comprises the first and second sensor circuits generating respective overcurrent signals which are summed by the pulse generating circuit to produce a single resulting train of pulses.

3. The overload detection circuit of claim 1, wherein the first current level is 100% of rated current for the electrically powered device.

4. The overload detection circuit of claim 3, wherein the second current level is 150% of rated current for the electrically powered device.

5. An overcurrent detection device of the type having a sensor circuit, an integrator circuit and a counter, wherein the sensor circuit is responsive to current feedback from an electrically powered device to produce an overcurrent signal when current exceeds a selected current level, wherein the integrator circuit has a capacitor that is charged in response to the overcurrent signal and then discharged to generate output signals, wherein the counter is responsive to output signals generated by the integrator to generate a fault signal when enabled by the accumulated count, and wherein an improvement comprises:

a reset means coupled across the capacitor of the integrator circuit and operable in response to a first logic signal for discharging the capacitor; and a comparator circuit coupled to the reset means and to the counter, the comparator circuit being responsive to an output signal from the integrator circuit that crosses a first threshold to couple the first logic signal to the reset means and being further responsive after a period of time to the output signal from the integrator circuit crossing a second threshold to couple a second logic signal to advance the counter one count, thereby preventing a delay that would otherwise occur between signals from the integrator circuit.

6. The overcurrent detection device of claim 5, wherein the reset means includes a resistive element and a switch coupling the resistive element across the capacitor, the switch being operable in response to the first logic signal to connect the resistive element to the capacitor and cause the capacitor to discharge.

* * * * *